United States Patent
Lee et al.

(10) Patent No.: US 9,030,976 B2
(45) Date of Patent: May 12, 2015

(54) BI-DIRECTIONAL DIGITAL INTERFACE FOR VIDEO AND AUDIO (DIVA)

(75) Inventors: Dongyun Lee, San Jose, CA (US); John Hahn, Los Altos, CA (US); Bong-Joon Lee, Seoul (KR); David Lee, Palo Alto, CA (US); Byoung-Woon Kim, Hwaseong-si (KR)

(73) Assignee: Silicon Image, Inc., Sunnyvale, CA (US)

( * ) Notice: Subject to any disclaimer, the term of this patent is extended or adjusted under 35 U.S.C. 154(b) by 1600 days.

(21) Appl. No.: 12/057,051

(22) Filed: Mar. 27, 2008

(65) Prior Publication Data

US 2009/0245345 A1 Oct. 1, 2009

(51) Int. Cl.
| | |
|---|---|
| H04B 1/52 | (2006.01) |
| H04N 5/44 | (2011.01) |
| H04N 5/765 | (2006.01) |
| H04N 5/85 | (2006.01) |
| H04N 21/43 | (2011.01) |
| H04N 21/4363 | (2011.01) |

(52) U.S. Cl.
CPC ............... *H04N 5/44* (2013.01); *H04N 5/765* (2013.01); *H04N 5/85* (2013.01); *H04N 21/4305* (2013.01); *H04N 21/43632* (2013.01); *H04N 21/43635* (2013.01)
USPC ............................ 370/282; 370/522; 709/231

(58) Field of Classification Search
USPC .......... 370/278, 282, 522, 527, 537; 709/220, 709/228, 229, 230, 231
See application file for complete search history.

(56) References Cited

U.S. PATENT DOCUMENTS

| | | | |
|---|---|---|---|
| 4,575,714 | A | 3/1986 | Rummel |
| 5,428,752 | A | 6/1995 | Goren et al. |
| 5,783,926 | A | 7/1998 | Moon et al. |
| 5,983,288 | A | 11/1999 | Visee |
| 6,339,831 | B1 | 1/2002 | Sugawara et al. |
| 6,567,007 | B1 | 5/2003 | Fritsche et al. |

(Continued)

FOREIGN PATENT DOCUMENTS

| | | |
|---|---|---|
| CN | 1655132 A | 8/2005 |
| CN | 101032113 | 9/2007 |

(Continued)

OTHER PUBLICATIONS

International Search Report from corresponding PCT Application No. PCT/US2009/038077.
Written Opinion from corresponding PCT Application No. PCT/US2009/038077.

(Continued)

*Primary Examiner* — Edan Orgad
*Assistant Examiner* — Curtis A Alia
(74) *Attorney, Agent, or Firm* — Fenwick & West LLP

(57) ABSTRACT

A communication system, comprising a first node, a second node, a serial communication link between the first node and the second node, configured to transmit digital video data from the first node to the second node over one or more video channels of the link. The communication system further including a hybrid link between the first node and the second node, wherein the first node and the second node are configured to transmit at least one stream of data to the other through a hybrid channel over the hybrid link. In the communication system, the bandwidth of the serial communication link is scaled according to a video pixel frequency. Further, the initial locking of the serial communication link is aided by clock information delivered over the hybrid link.

26 Claims, 10 Drawing Sheets

(56) References Cited

U.S. PATENT DOCUMENTS

| | | | |
|---|---|---|---|
| 7,142,094 B1 | | 11/2006 | Davidow et al. |
| 7,295,578 B1 | * | 11/2007 | Lyle et al. ............... 370/503 |
| 7,639,765 B2 | * | 12/2009 | Suzuki et al. ............ 375/354 |
| 7,856,561 B2 | | 12/2010 | Stineman et al. |
| 7,916,780 B2 | | 3/2011 | Lee |
| 7,936,546 B2 | | 5/2011 | Vorenkamp et al. |
| 7,940,809 B2 | | 5/2011 | Lee |
| 7,958,286 B2 | | 6/2011 | Bresemann et al. |
| 8,122,159 B2 | | 2/2012 | Monreal |
| 8,355,327 B2 | | 1/2013 | Lida et al. |
| 2002/0171741 A1 | | 11/2002 | Tonkin et al. |
| 2003/0035049 A1 | | 2/2003 | Dickens et al. |
| 2003/0043771 A1 | | 3/2003 | Mizutani et al. |
| 2003/0048852 A1 | | 3/2003 | Hwang et al. |
| 2004/0073697 A1 | | 4/2004 | Saito et al. |
| 2004/0267974 A1 | | 12/2004 | Dunstan |
| 2005/0004708 A1 | | 1/2005 | Goldenberg et al. |
| 2005/0004718 A1 | | 1/2005 | Issa et al. |
| 2005/0080935 A1 | | 4/2005 | Fukae et al. |
| 2005/0132109 A1 | | 6/2005 | Steger |
| 2005/0162338 A1 | | 7/2005 | Ikeda et al. |
| 2006/0026651 A1 | | 2/2006 | Kwon et al. |
| 2006/0100799 A1 | | 5/2006 | Karam |
| 2006/0164098 A1 | | 7/2006 | Su |
| 2007/0200859 A1 | * | 8/2007 | Banks et al. ............. 345/520 |
| 2007/0201546 A1 | | 8/2007 | Lee |
| 2007/0257923 A1 | | 11/2007 | Whitby-Strevens |
| 2008/0005433 A1 | | 1/2008 | Diab et al. |
| 2008/0008470 A1 | | 1/2008 | Lin et al. |
| 2008/0028120 A1 | | 1/2008 | McLeod |
| 2008/0122556 A1 | | 5/2008 | Oshima et al. |
| 2008/0150718 A1 | | 6/2008 | Apfel |
| 2008/0293365 A1 | | 11/2008 | Sim et al. |
| 2008/0301748 A1 | | 12/2008 | Lida et al. |
| 2008/0317181 A1 | | 12/2008 | Suzuki et al. |
| 2009/0013366 A1 | * | 1/2009 | You et al. ................ 725/118 |
| 2009/0177818 A1 | | 7/2009 | Shim et al. |
| 2009/0245345 A1 | | 10/2009 | Lee et al. |
| 2009/0248918 A1 | | 10/2009 | Diab et al. |
| 2009/0260043 A1 | * | 10/2009 | Tatsuta et al. ............ 725/81 |
| 2010/0073574 A1 | | 3/2010 | Nakajima et al. |
| 2010/0100200 A1 | | 4/2010 | Kim et al. |
| 2010/0142723 A1 | | 6/2010 | Bucklen |
| 2010/0283324 A1 | | 11/2010 | Lee et al. |
| 2014/0115110 A1 | | 4/2014 | Altmann |

FOREIGN PATENT DOCUMENTS

| | | |
|---|---|---|
| CN | 101436871 A | 5/2009 |
| EP | 0166441 | 1/1986 |
| EP | 1473941 | 3/2004 |
| JP | 11-112524 A | 4/1999 |
| JP | 2003-111058 A | 4/2003 |
| JP | 2004-350266 A | 12/2004 |
| JP | 2005-051741 A | 2/2005 |
| JP | 2005-129010 A | 5/2005 |
| JP | 2005-173553 A | 6/2005 |
| JP | 2005-217799 A | 8/2005 |
| JP | 2007-134803 A | 5/2007 |
| JP | 2008-017438 A | 1/2008 |
| JP | 2008-054327 A | 3/2008 |
| JP | 2008-529463 A | 7/2008 |
| JP | 2008-310300 A | 12/2008 |
| JP | 2009-124705 A | 6/2009 |
| KR | 10-2005-0012310 | 2/2005 |
| TW | 200303711 | 9/2003 |
| TW | 200843279 A | 11/2008 |

OTHER PUBLICATIONS

Decision on Rejection dated Feb. 5, 2013 (+ English translation), in Chinese Patent Application No. 200980100976.3, 16 pages.

Microprocessor and Microcomputer Standards Committee of the IEEE Computer Society, "IEEE P1394r Draft 1 Darft Standard for High Performance Serial Bus", 2007.

Office Action dated Jul. 31, 2012 (+ English translation), in Taiwan Patent Application No. 098110096, 35 pages.

"Electrical Transient Immunity for Power-Over-Ethernet," Application Report, SLVA233A, Texas Instruments, Apr. 2006, Revised Aug. 2006, 20 pages.

"Introduction to DiiVA Designed Specifically for Home Entertainment Networking," DiiVA Licensing LLC, 2010, 4 pages.

Digital Visual Interface DVI Revision 1.0, Digital Display Working Group, Apr. 2, 1999, 76 pages.

DiiVA Specification 1.1 Draft A, DiiVA Promoters Group, distribution date Jan. 7, 2010, 188 pages.

DisplayPort Ver. 1.2 Overview, DisplayPort Developer Conference, Taipei, Dec. 6, 2010, 33 pages.

High-Definition Multimedia Interface Specification Version 1.3, HDMI Licensing, LLC, Jun. 22, 2006, 237 pages.

Hirofuchi T. et al., "USB/IP—a Peripheral Bus Extension for Device Sharing over IP Network," Proceedings of the Usenix Annual Technical Conference, Jan. 1, 2005, pp. 47-60, XP007901448.

International Search Report and Written Opinion of the International Searching Authority dated Jun. 29, 2010, in International Patent Application No. PCT/US2009/067744, 10 pages.

"International Search Report and Written Opinion of the International Searching Authority dated Sep. 27, 2011, in International Patent Application No. PCT/US11/21031", Whole Document.

Office Action dated Jan. 31, 2012 (+ English translation), in Chinese Patent Application No. 200980100976.3, 21 pages.

Office Action dated Mar. 30, 2012 (+ English translation), in Chinese Patent Application No. 200980105447.2, 16 pages.

Office Action dated Nov. 29, 2012 (+ English translation), in Chinese Patent Application No. 200980105447.2, 8 pages.

Office Action dated Sep. 3, 2013 (+ English translation), in Chinese Patent Application No. 200980100976.3, 21 pages.

"Office Action for Patent Application No. 2011-501975", (Aug. 5, 2013), Whole Document.

Office Action mailed Feb. 1, 2013, in U.S. Appl. No. 12/636,063, 9 pages.

Supplementary European Search Report completed Nov. 4, 2013, in European Patent Application No. EP11733339, 9 pages.

Universal Serial Bus 3.0 Specification (including errata and ECNs through May 1, 2011), Revision 1.0, Hewlett Packard Company et al., Jun. 6, 2011, 531 pages.

Universal Serial Bus Specification, Revision 2.0, Compaq Computer Corporation et al., Apr. 27, 2000, 650 pages.

Taiwan Office Action, Taiwan Application No. 098142426, Dec. 23, 2013, 12 pages

Japanese Office Action, Japanese Application No. 2011-540936, Jan. 6, 2014, 6 pages (with partial English translation).

European Extended Search Report, European Application No. 11733339.3, Nov. 12, 2013, 8 pages Japanese Office Action, Japanese Application No. 2011-540936, Jun. 3, 2014, 4 pages.

Japanese Office Action, Japanese Application No. 2012-549056, Jul. 8, 2014, 5 pages (with English summary).

Chinese First Office Action, Chinese Application No. 201180005935.3, Aug. 27, 2014, 14 pages.

Korean Office Action, Korean Application No. 10-2010-7024163, Jan. 30, 2015, 12 pages.

* cited by examiner

FIG. 6a Both Source and Sink have no data to transfer

FIG. 6b Source has a little data (eg, Audio SC) to transfer and Sink have no data to transfer FIG. 6c Source has a little data (eg, Audio SC) to transfer and Sink has a lot of data (eg, Data SC) to transfer FIG. 6d Source has a lot of data (eg, Audio SC and Data SC) to transfer and Sink has also a lot of data (eg, Data SC) to transfer

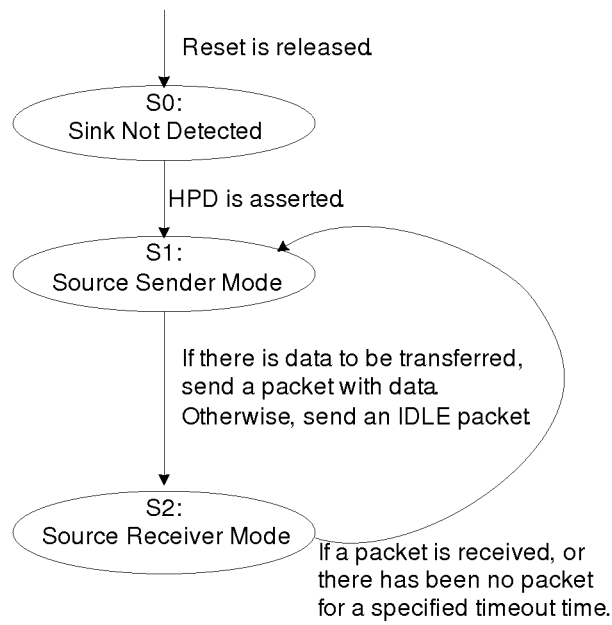
FIG. 7a. H-CH Source State Diagram
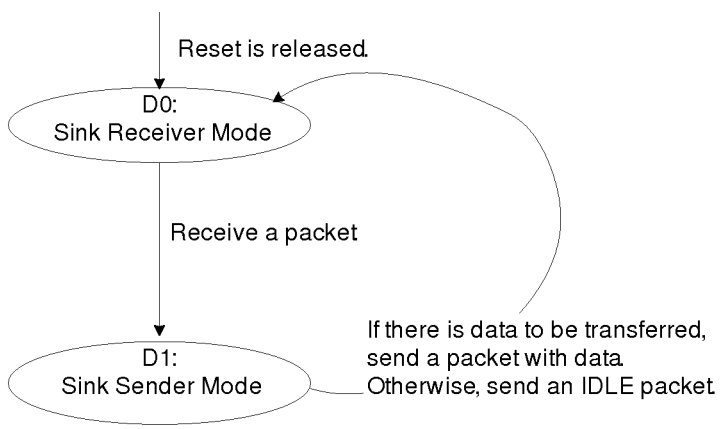
FIG. 7b. H-CH Sink State Diagram

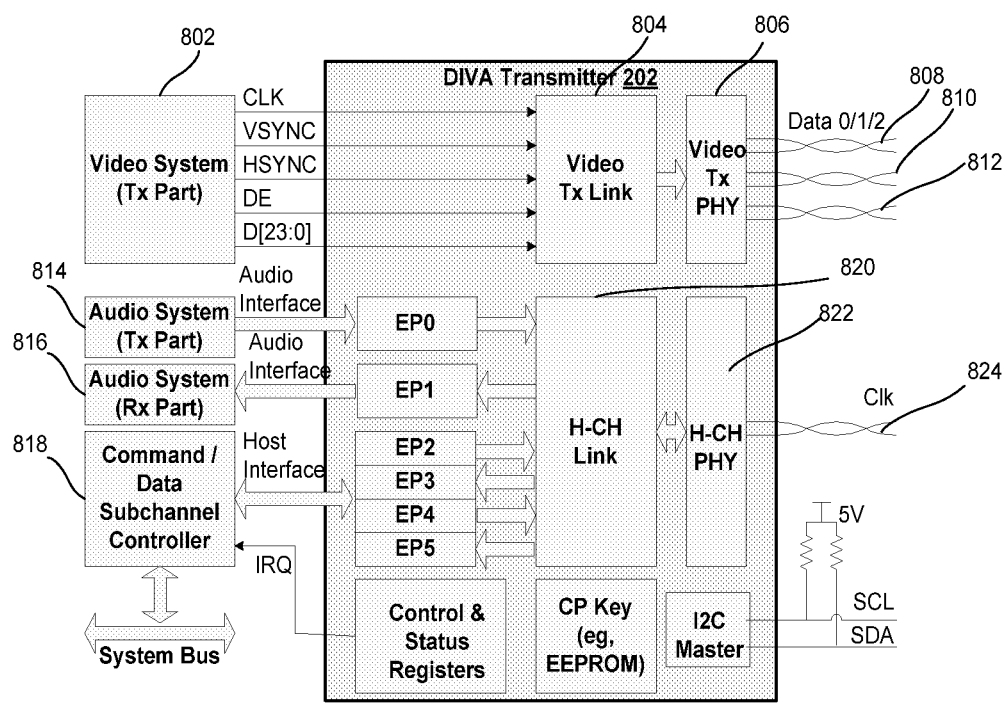
FIG. 8. Example of DIVA Transmitter

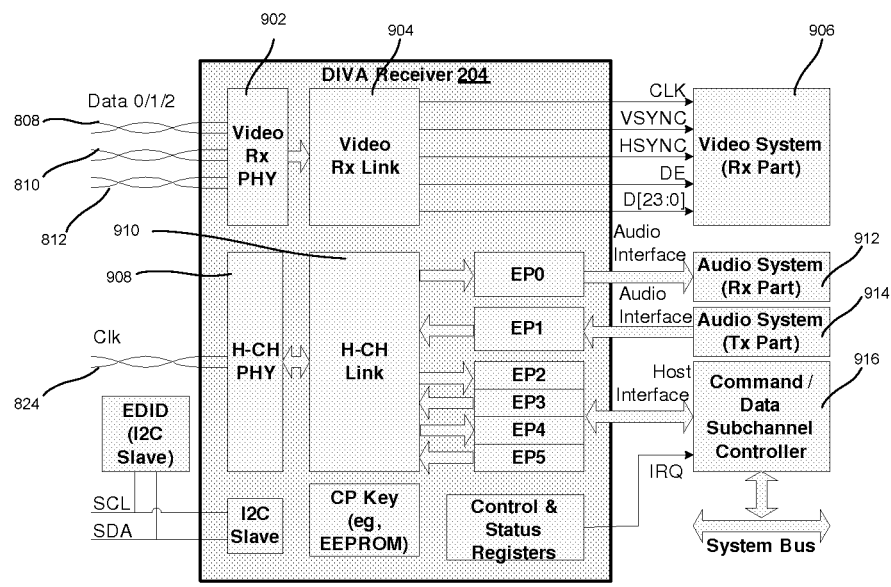
FIG. 9. Example of DIVA Receiver

BI-DIRECTIONAL DIGITAL INTERFACE FOR VIDEO AND AUDIO (DIVA)

FIELD OF THE INVENTION

The present invention is directed to systems and methods for transmitting video, audio, command and control data and other information over a bi-directional hybrid link. Preferred embodiments employ clocking embedded in the serial communication link, so that an additional channel, otherwise used for sending clock signals, is available for bi-directional data transfer.

BACKGROUND

Embodiments of the invention disclosed describe a new method and system for connecting and adding greater functionality to electronic devices. Previous standards in digital connectivity enabled transfer of protected uncompressed video and audio data from a source device (e.g., a DVD player) to a sink device (e.g., a TV) in a unidirectional path. FIG. 1 illustrates a prior art system wherein is shown a video channel 106 for carrying video data from an HDMI Source device 102 to an HDMI sink device 104. Also shown is an HDMI control channel 108. Essentially, systems and methods typically using TMDS or TMDS-like serial links send encoded video data from a transmitter (HDMI Source 102 in FIG. 1) to a receiver (HDMI Sink 104 in FIG. 1) over video channels 106 during active video periods, encoded audio data during active audio periods, and encoded control data during active control periods of the same video channels. In typical prior art systems as illustrated in FIG. 1, the HDMI Control Channel 108 is an under utilized very low bandwidth channel, and cannot be used to send additional user data like audio data, video data, or/and bulk user data. It would thus be desirable to have the use of a high bandwidth channel in addition to the illustrated video channel. Embodiments of the current invention allow for the usage of an additional high bandwidth channel that operates bi-directionally, but without the need to increase the number of circuits or connections.

In typical prior art systems like that illustrated in FIG. 1, a pixel clock is transmitted over a separate clock channel in the TMDS link. FIG. 3 illustrates a prior art video data transmission through a TMDS encoder and decoder, along with a separate, dedicated clock channel. By embedding the clock signal of the clock channel in the video data channel or channels, the design would free up the conventional clock channel in conventional systems to provide an additional channel for bi-directional data transfer.

Embodiments of the invention disclose a system and method of a high-speed hybrid channel that can carry compressed video, high quality audio, content protection, control signals, and data packets in both directions, i.e. from source to sink and sink to source. Embodiments described disclose both a unique physical and logical layer making it a stand-alone complete standard. Additionally, it would be desirable to have a system that can be made backwards compatible with other existing standards such as HDMI, DVI, and DisplayPort. The embodiments described can be made compatible to other standards such as HDMI, DVI, and DisplayPort.

SUMMARY

An embodiment includes a communication system, comprising a first node, a second node, a serial communication link between the first node and the second node, configured to transmit digital video data from the first node to the second node over one or more video channels of the link; and a hybrid link between the first node and the second node, wherein the first node and the second node are configured to transmit at least one stream of data to the other through a hybrid channel over the hybrid link. In a preferred embodiment of the communication system the bandwidth of the serial communication link is scaled according to a video pixel frequency. Further, the initial locking of the serial communication link is aided by clock information delivered over the hybrid link.

Another embodiment includes, in a communication system, a hybrid link between a first node and a second node for transmitting and receiving clock signals and data packets, the said hybrid link comprising a bi-directional channel coupled between the first node and the second node, a first transceiver in the first node, a second transceiver in the second node, wherein the hybrid link delivers the clock signal to aid synchronization between the first node and the second node and wherein the hybrid link delivers the data packet after the synchronization is established.

Another embodiment includes a communication node configured to be coupled to a serial communication link having at least one video channel and a hybrid channel having at least one sub-channel, the communication node comprising an input coupled to receive video data and a clock signal or signals from a video system, a hybrid channel interface coupled to receive and transmit user and application data to and from a user and application sub-system, video outputs configured to be coupled to the serial communication link, wherein the clock signal or signals are embedded with video data in the serial communication link, and circuitry coupled between the outputs and each said input and interface, and configured to generate video data and user and application data, wherein the video data is transmitted through the serial communication link, and the user and application data is transmitted through a general purpose data channel in the hybrid link.

Yet another embodiment includes a communication node configured to be coupled to a serial communication link having at least one video channel and a hybrid channel having at least one sub-channel, the communication node comprising: an input configured to be coupled to the serial communication link, to receive video data, including a clock signal or signals embedded in the video data, a hybrid channel interface coupled to receive and transmit user and application data to and from a user and application sub-systems, a video output for asserting video data received from the serial communication link, and circuitry, coupled between said input and each said interface and video output, and configured to recover a pixel clock from the video data, wherein the received video data is asserted to the video output, and the user and application data is transmitted through a general purpose data channel in the hybrid link.

Yet another embodiment includes, in a communication system, a method of communication comprising transmission of digital video data from a first node to a second node over one or more video channels of a serial communication link, transmission of at least one stream of supporting data between the first and the second node over a hybrid link, and scaling the bandwidth of the serial communication link according to a video pixel frequency.

Still another embodiment includes in a communication system, a method for transmitting and receiving a clock signal and data packet over a hybrid link between a first and second node, the said method comprising delivering, through the hybrid link, the clock signal, to aid synchronization between the first node and the second node such that the hybrid link delivers the data packet after the synchronization is established.

BRIEF DESCRIPTION OF THE DRAWINGS

FIG. 7a is a self-explanatory Hybrid Channel Source state diagram.

FIG. 7b is a self-explanatory Hybrid Channel Sink state diagram.

FIG. 8 illustrates a detailed diagram of a transmitter device according to an embodiment, which transmitter device is connected to a video transmitting system, an audio receiving and transmitting system, and a command and data sub-channel controller, and transmits data to a connected receiver device.

FIG. 9 illustrates a detailed diagram of a receiver device according to an embodiment, which receiver device is connected to the transmitter device of FIG. 8, and to a video receiving system, an audio receiving and transmitting system, and a command and data sub-channel controller.

DETAILED DESCRIPTION

In following the conventions of previously established display interface standards, we will have 3 classes of Digital Interface for Video and Audio (DIVA) devices.

Source:

Devices which transmit a video (and audio, if applicable) signal. Source devices may enforce content protection if required. These devices may or may not have storage capability. Some examples include:

DVD players (both standard definition and high definition)

Digital video recorders

Set top boxes

Desktop and laptop computers

Digital video and image capture devices such as camcorders and cameras

Multimedia mobile phones

Sink:

Devices which receive a video (and audio, if applicable) signal. A Display is defined as a special type of Sink. Examples include:

TVs

PC monitors

Home stereo systems

Repeater:

Any device which includes a Source and Sink function as well as a re-transmission function between the Sink (input) and Source (output) and is software transparent. Examples include:

AV Receivers

Input Selectors/Switches

At any given time, a DIVA cluster of devices will have one master device (typically a TV or Monitor) and several member devices that are under the master device's control. This above list of Source, Sink, and Repeater devices is intended to impart a general understanding of the device types that are expected or available in the market. Other devices and variants are possible as would be apparent to one skilled in the art. A DIVA device may have more than one DIVA input or output. In this case, each DIVA input on a device shall follow all the rules for a DIVA Sink and each DIVA output shall follow all the rules for a DIVA Source.

Figure 1:
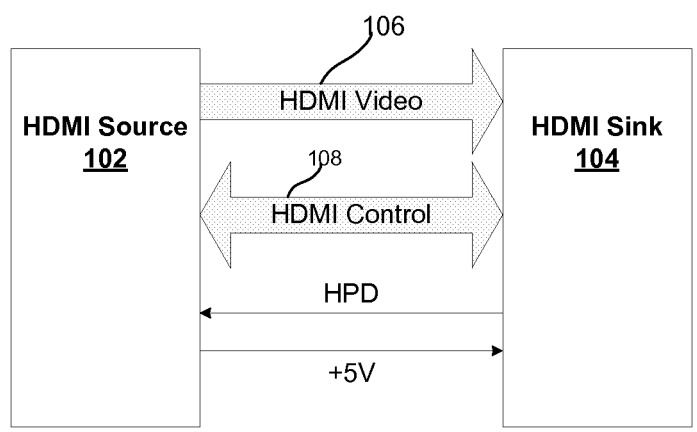
FIG. 1 illustrates a conventional prior art HDMI system.
Figure 3:
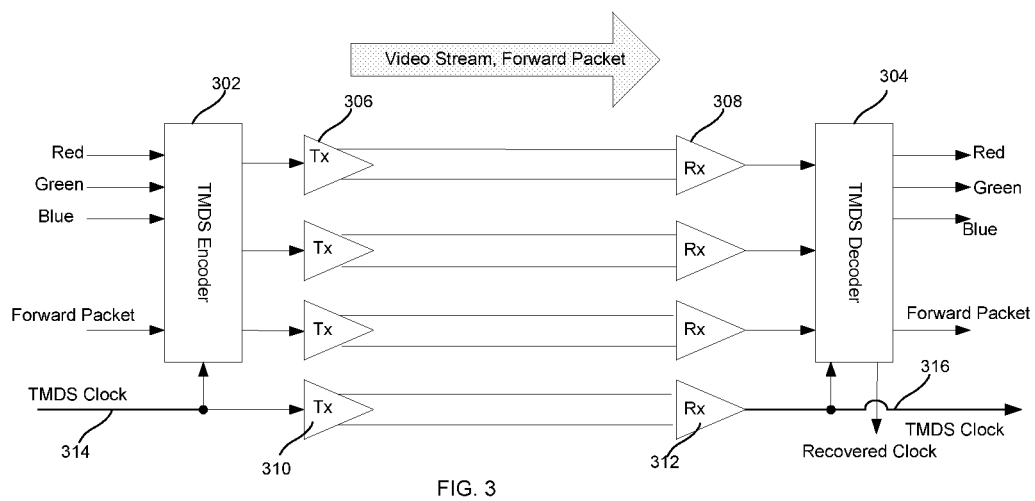
FIG. 3 illustrates a prior art uni-directional video data transmission through a TMDS encoder and decoder, along with a separate, dedicated clock channel.

FIG. 1 illustrates a conventional prior art HDMI system, wherein the system comprises an HDMI Source 102, an HDMI Sink 104, a uni-directional HDMI Video Link 106 comprising channels for transmitting video data, and an HDMI control facility 108. FIG. 3 illustrates a prior art uni-directional video data transmission through a TMDS encoder and decoder, along with a separate, dedicated clock channel. The TMDS encoder 302 transmits forward video packets through transmission buffers 306. The TMDS decoder receives transmitted forward video packets through receiver buffers 308. A separate clock channel transmits and receives TMDS clock signals 314 through buffers 310 and 312 respectively.

Figure 2:
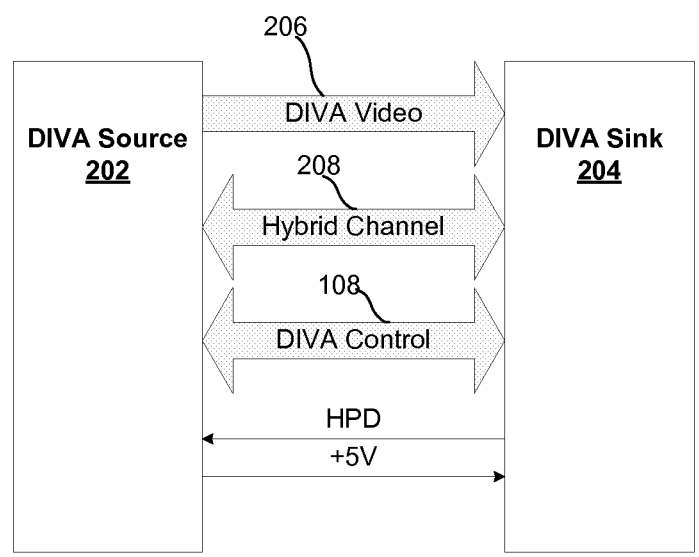
FIG. 2 illustrates a high level embodiment of the present invention.

FIG. 2 illustrates a high level embodiment of the present invention. A preferred embodiment includes a communication system, comprising a first node 202 (DIVA Source), a second node 204 (DIVA Sink), a serial communication link 206 between the first node and the second node, configured to transmit digital video data from the first node to the second node over one or more video channels of the link. The embodiment further includes a hybrid link 208 between the first node and the second node, wherein the first node and the second node are configured to transmit at least one stream of data to the other through a hybrid channel over the hybrid link. In a preferred embodiment of the communication system the bandwidth of the serial communication link is scaled according to a video pixel frequency. Further, the initial locking of the serial communication link is aided by clock information delivered over the hybrid link. The hybrid link further comprises a hybrid channel or channels which includes a reference clock for the serial communication link, an audio sub-channel for digital audio streaming, a command sub-channel for content protection, consumer electronics control and other control commands, and a data sub-channel for user data transfers.

Figure 4:
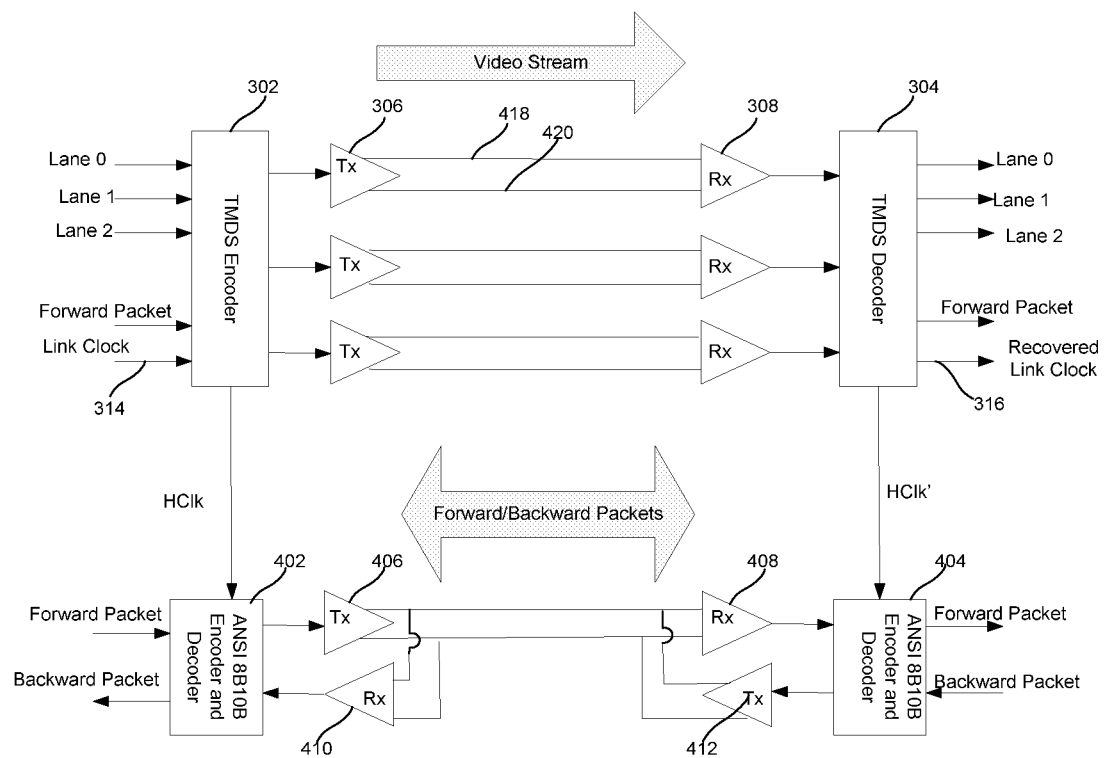
FIG. 4 illustrates an embodiment wherein a Link clock is embedded in the video channel between the Link encoder and Link decoder, and wherein the additional, available clock channel is used for bi-directional data transceiving.

FIG. 4 illustrates an embodiment wherein a clock is embedded in the video channel between the encoder and decoder, and wherein the additional, available clock channel is used for bi-directional transmission and receiving of data. Contrasted with the prior art system illustrated in FIG. 3, the TMDS clock 314 in the prior art system is replaced by the Link Clock 414 in the embodiment illustrated in FIG. 4, and is embedded in the video data channel, with forward and backward data packets sent through an additional channel (FIG. 4).

In an embodiment, the hybrid channel is a high-speed half-duplex channel, made logically a full-duplex bi-directional channel by alternating the direction of transmission. In the embodiment, the audio sub-channel, the command sub-channel and the data sub-channel are time multiplexed over the hybrid channel. The circuitry in the hybrid channel is clocked by the reference clock when the hybrid channel is assigned to the reference clock. The circuitry in the hybrid channel is clocked by the recovered clock from the serial communication channel when the hybrid channel is assigned to other than the reference clock. Additionally, in an alternative embodiment, circuitry in the hybrid channel is clocked by local oscillators when the hybrid channel is assigned to other than the reference clock. In a preferred embodiment the hybrid channel further comprises a lock detection circuit on the second node and a switch that switches between the reference clock and the sub-channels.

Figure 5:
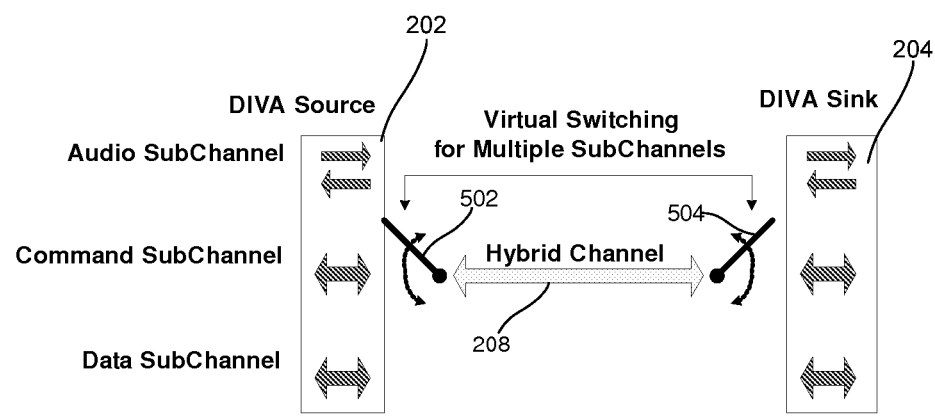
FIG. 5 illustrates an embodiment wherein a hybrid bi-directional channel incorporates virtual switching for multiple sub-channels.

FIG. 5 illustrates an embodiment wherein a hybrid bi-directional channel incorporates virtual switching for multiple sub-channels. The switch 502, 504 is essentially a virtual switch that arbitrates between the audio sub-channel, the command sub-channel, and the data sub-channel. In a preferred embodiment, the switch arbitrates between the sub-channels such that audio data through the audio sub-channel is given the highest priority, command and control data through the command sub-channel is given the next highest priority, and user or bulk data through the data sub-channel is given the lowest priority. Also, the serial communication link has a clock embedded in one or more video data channels of the link.

Referring back to FIG. 4, in a preferred embodiment, the serial communication link uses an IBM 8B10B channel coding 402 wherein a clock channel is embedded within a digital video data channel 418, 420, and wherein the transmitter is configured to transmit a pixel clock in the embedded clock channel. In one embodiment, the serial communication link employs a TMDS channel coding wherein the clock channel is embedded within the digital video data channel, and wherein the first node is configured to transmit the pixel clock in the embedded clock channel. In the hybrid channel of a preferred embodiment, the data is transmitted in packets of varying sizes and flow direction between the first node and the second node changes after every packet transfer.

Figure 6A:
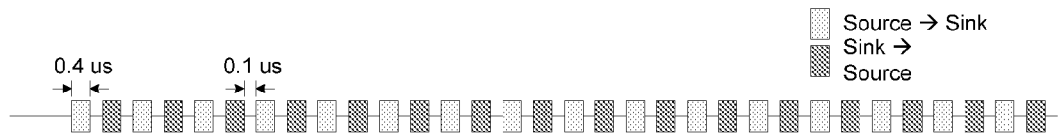
FIGS. 6a-6d illustrate change of flow direction of data between a Source and Sink depending upon the amount of data involved and its' direction of flow.
Figure 6B:
Figure 6C:
Figure 6D:
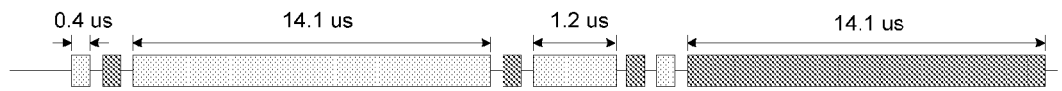

FIGS. 6a-6d illustrate change of flow direction of data in the hybrid channel between a Source and Sink depending upon the amount of data involved and its' direction of flow. FIG. 6a illustrates a scenario wherein neither the Source nor Sink has any data to transfer to the other side. FIG. 6b illustrates a scenario wherein the Source has a little data (e.g., Audio SC) to transfer and the Sink has no data to transfer. FIG. 6c illustrates a scenario wherein the Source has a little data (e.g., Audio SC) to transfer and Sink has a lot of data (e.g., Data SC) to transfer. And FIG. 6d illustrates a scenario wherein the Source has a lot of data (e.g., Audio SC and Data SC) to transfer and the Sink also has a lot of data (e.g., Data SC) to transfer. In a preferred embodiment, packet transfer timing parameters are as follows:
Screen Size=1920×1080p @ 60 Hz
A horizontal line time=15 us (=1/[1080×60])
TMDS Clock=148.5 MHz
H-CH Bit Rate=1.5 Gbps
Propagation delay (25 m cable)=0.13 us
Preamble time (500 training bits)=500×0.67 ns=0.33 us
A 0-byte packet time=(10+0)×10×0.67 ns=0.1 us
A 128-byte packet time=(10+128)×10×0.67 ns=0.9 us
A 2048-byte packet time=(10+2048)×10×0.67 ns=13.8 us
Worst Time between sending packets=2×(0.13+0.33+13.8)=28.5 us FIG. 7a is a self-explanatory Hybrid Channel Source state diagram, further illustrating packet flow control. Essentially, when the Source is in sender mode and there is data to be sent, a data packet is sent across to the sink device. If on the other hand, there is no data to be sent, the Source sends across an IDLE packet. Then the source enters receiver mode, wherein either a packet is received, or if no packet is received for a specified period of time, the Source once again enters sender mode. Similarly, FIG. 7b is a self-explanatory Hybrid Channel Sink state diagram further illustrating packet flow control. When the Sink is in receiver mode it receives a packet after which it enters sender mode. In sender mode, the Sink either sends a packet of data or if there is no data to be sent, it sends an IDLE packet before once again entering receiver mode. Note that when neither the Source nor the Sink needs to send or receive packets, an IDLE packet is sent from one side to the other.

In a preferred embodiment of a communication system is included a hybrid link between a first node and a second node for transmitting and receiving a clock signal or signals and a data packet, the said hybrid link comprising a bi-directional channel coupled between the first node and the second node, a first transceiver in the first node, a second transceiver in the second node, wherein the hybrid link delivers the clock signal to aid synchronization between the first node and the second node wherein the hybrid link delivers the data packet after the synchronization is established. Additionally, the data packet is/are a plurality of data packets, and the packet types comprise audio, command, and user bulk data packets.

FIG. 8 illustrates a detailed diagram of a transmitter device according to an embodiment, which transmitter device is connected to a video transmitting system, an audio receiving and transmitting system, and a command and data sub-channel controller, and transmits data to a connected receiver device. The illustrated embodiment includes a communication node 202 configured to be coupled to a serial communication link having at least one video channel 808, 810, 812, and a hybrid channel 824 having at least one sub-channel, the communication node comprising an input coupled to receive video data and a clock signal or signals from a video system 802, a hybrid channel interface coupled to receive and transmit user and application data to and from a user and application sub-system 814, 816, 818, video outputs 804, 806 configured to be coupled to the serial communication link, wherein the clock signal or signals are embedded with video data in the serial communication link, and circuitry coupled between the outputs and each said input and interface, and configured to generate video data and user and application data, wherein the video data is transmitted through the serial communication link, and the user and application data is transmitted through a general purpose data channel in the hybrid link. The user and application data includes audio data transmitted and received by an audio system 814 and 816 respectively, command and control data transmitted and received by a command/data sub-channel controller 818, and user bulk data (not shown).

FIG. 9 illustrates a detailed diagram of a receiver device according to an embodiment, which receiver device is connected to the transmitter device of FIG. 8, and to a video receiving system, an audio receiving and transmitting system, and a command and data sub-channel controller. The illustrated embodiment includes a communication node 204 configured to be coupled to a serial communication link having at least one video channel 808, 810, 812, and a hybrid channel 824 having at least one sub-channel, the communication node comprising an input configured to be coupled to the serial communication link, to receive video data, including a clock signal or signals embedded in the video data. The communication node further comprises a hybrid channel interface 908, 910, coupled to receive and transmit user and application data to and from user and application sub-systems. Additionally provided is a video output 902, 904 for asserting video data received from the serial communication link, circuitry coupled between said input and each said interface and video output, and configured to recover a pixel clock from the video data, wherein the received video data is asserted to the video output, and the user and application data is transmitted through a general purpose data channel in the hybrid link. The user and application data includes audio data transmitted and received by an audio system 912, 914, command/control data transmitted and received by a command/control data sub-channel controller 916, and bulk data (not shown).

A preferred embodiment includes, in a communication system, a method of communication comprising transmission of digital video data from a first node to a second node over one or more video channels of a serial communication link, transmission of at least one stream of supporting data between the first and the second node over a hybrid link, and scaling the bandwidth of the serial communication link according to a video pixel frequency. Also, the method includes, in the hybrid link, transmitting a reference clock for the serial communication link, transmitting digital audio data over an audio sub-channel for digital audio streaming, transmitting command data over a command sub-channel for content protection, consumer electronics control, and other control commands, and transmitting bulk data over a data sub-channel for user data transfers. Additionally, the method further comprises alternating the direction of transmission in the hybrid channel such that the hybrid channel functionality is logically that of a full-duplex bi-directional channel. An alternate embodiment comprises time multiplexing over the hybrid channel, the audio sub-channel, the command sub-channel and the data sub-channel. Preferably, the method comprises, in the hybrid channel, detecting a lock from the second node of the hybrid channel and switching, in the hybrid channel, between the reference clock and the sub-channels. Further, the method comprises, arbitrating, in the hybrid channel, between the audio sub-channel, the command sub-channel and the data sub-channel based on a pre-defined priority. The method further comprises embedding a clock in one or more video data channels of the serial communication link such that a pixel clock is transmitted in the embedded clock channel over the serial communication link. In the hybrid channel, transmission of data packets is of varying sizes, and the method comprises changing the flow direction between the first and second node after every packet transfer.

Another embodiment includes, in a communication system, a method for transmitting and receiving a clock signal and data packet over a hybrid link between a first and second node, the said method comprising delivering, through the hybrid link, the clock signal, to aid synchronization between the first node and the second node such that the hybrid link delivers the data packet after the synchronization is established. A plurality of data packets can be delivered through the hybrid link. The plurality of data packets includes audio data, command data, and bulk user data. Preferably, the hybrid link comprises a bi-directional channel coupled between a first transceiver in the first node and a second transceiver in the second node, and the method further comprises locking of the serial communication link based on clock information delivered over the hybrid link. Note that the packet types and user and application data delivered over the hybrid link can also include compressed video data.

Figure 10:
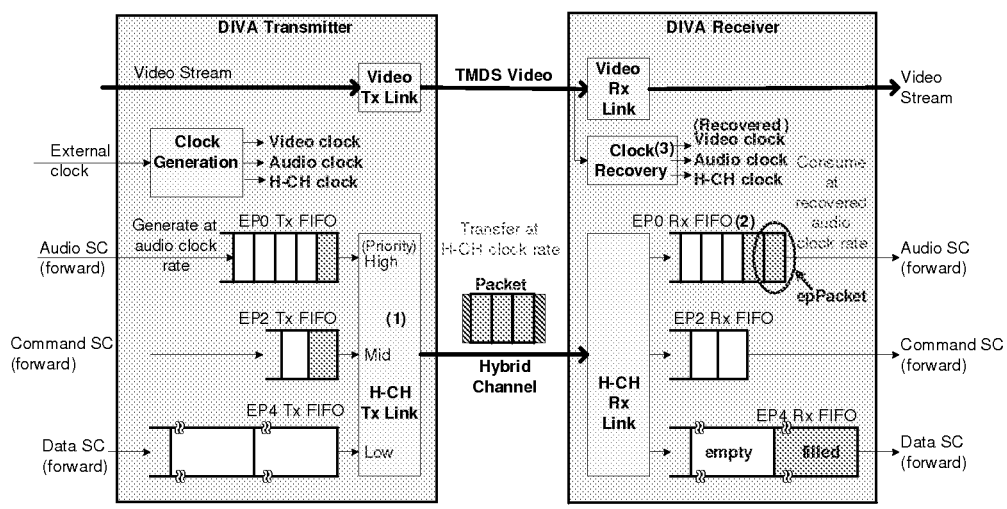
FIG. 10 illustrates a detailed embodiment of the complete system and method.

FIG. 10 illustrates a detailed embodiment of the complete system and method. The DIVA transmitter receives input of a video stream, and transmits the video data through a video transmitter link over the serial communications link. An external clock is received by the clock generator, and an audio, video and hybrid channel clock is transmitted by embedding in the serial communication link. The hybrid channel link in the DIVA transmitter receives and transmits audio, command, and bulk data from the audio sub-channel, command sub-channel, and data sub-channel respectively. Audio data receives the highest priority, while bulk data receives the lowest priority, and is transmitted to the DIVA receiver over the hybrid channel. Note that the Hybrid link data flow in FIG. 10 illustrates sub-channel data going in the forward direction. For the Hybrid link both the DIVA Transmitter and DIVA Receiver can send and receive data. It is also possible to send data in the reverse direction on the Endpoints EP1, EP3 and EP5 (not shown in FIG. 10). EP0 and EP1 represent endpoint packets for transmitting and receiving audio data, EP2 and EP3 represent endpoint packets for transmitting and receiving command data, and EP4 and EP5 represent endpoint packets for transmitting and receiving user data or bulk data, and are all depicted in FIGS. 8 and 9. The DIVA receiver receives video data over the serial communication link and asserts the video data through the video receiving link. A clock recovery circuit recovers the video, audio and hybrid channel clocks, embedded in the serial communication link, and uses the recovered clocks to assert video, audio and command data. For example, the endpoint packets for audio data are consumed at the recovered audio clock rate.

EXAMPLE EMBODIMENTS

Usage Models:

Like the data types that can be transferred between Source and Sink, usage models will be classified into 4 major categories: Uncompressed Video and Audio from Source to Sink, CE Control, Bulk Data Transfer, and Bi-Directional Audio.

Uncompressed Video and Audio from Source to Sink:

A common usage case is to send uncompressed video and audio data from a video source (such as a DVD player) to a display device. In the embodiment illustrated, the primary video channel employs 1 to 3 twisted pairs to send video data. An ideal embodiment for the interface has a speed of 4.5 Gbps per twisted pair, and 13.5 Gbps total. Optionally, 1 to 4 data channels can be provided. As described in embodiments in the Detailed Description, a unique characteristic of the invention is that the clock of the video channel will be recovered by receiver PHY and the recovered clock will be used for the hybrid channel. Additionally, audio data can be sent through the hybrid channel. Both video and audio data are allowed to pass through Repeater devices before reaching the Sink device. Video data can have a pixel size of 18, 24, 30, 36 or 48 bits. At minimum, in preferred embodiments, video resolution support will support resolutions from VGA (640×480) to 1080p (1920×1080) depending on the display's capabilities. Additional and alternate support variations are possible as would be apparent to one skilled in the art. Further, the usage of data channels can vary by application. Source and Sink devices are allowed to support the minimum number of lanes required for their needs. However, in preferred embodiments, the external cable that is detachable by an end user is required to support at least 3 lanes to maximize the interoperability between Source and Sink devices.

In alternate embodiments, a number of lines can be reserved to maintain backward compatibility with other existing standards. In one embodiment, there are provided five lines, including one twisted pair and three straight lines.

Consumer Electronics (CE) Control:

The system described in the Detailed Description enables control of multiple electronic devices through a single master device. At all times, there will be one master device (in an example embodiment, a TV (Sink) is used as a master device) that can control multiple slave devices. In a preferred embodiment, a slave device can only have one master device. Preferably, device detection and enumeration occurs when a slave device in plugged into a network.

In a preferred embodiment, the master device detects that a DIVA slave device is connected to it. The next time the user queries to see what devices are connected, the new DIVA slave device is listed on the interface for a user to control. In the case that multiple masters are active in a network, all slave devices, in a preferred embodiment, can be detected by the multiple masters, but in an ideal embodiment, a slave can only be under the control of one master. As part of device enumeration, a DIVA slave device provides a list of functions to the DIVA master so that the DIVA master is able to control the DIVA slave device. Also, a set of required commands per device type is listed. In some embodiments, DIVA control can be implemented across various CE device manufacturers to ensure interoperability by requiring devices to support specific functions per device type.

Existing prior art systems like HDMI incorporate CEC functionality allowing for components to be controlled through a TV by using a dedicated CEC control pin to transfer data. In the embodiments disclosed, control data is sent through the high speed hybrid channel, resulting in data transfer with minimal latency, to give better system responsiveness to the end user.

Examples of CE control include the following:

Example 1: A user wishes to control his or her DIVA-compliant DVD Player from their DIVA-compliant TV. Once the DVD player is attached to the TV, the TV is able to detect the DVD player. The user can then turn the DVD player on and off through the TV. Further, the user can discover the features of the DVD player, and its' accessible functions, through the TV. For example, the user can Play, Stop, Pause, FF and RW as well as get to the Title Menu and navigate the menu through the TV remote control.

Example 2: Play a file from PC to TV via DIVA—Assuming that the PC and TV are both DIVA-compliant, the user can query the slave device from the master (say the TV in this case) to see what control functions are available. In addition, the user can navigate through the directory of the PC using his or her TV remote control using, in preferred embodiments, just the up, down, left, right, and enter buttons. Once a media file (such as MP3 or MPEG video) is found, then user should be able to select it and play the file.

Bulk Data Transfer:

By using the data sub-channel of DIVA's hybrid channel as described in the Detailed Description, large data files can be speedily transferred from a source device to a destination device. USB or Ethernet data can be sent directly through the DIVA data sub-channel. In the case USB or Ethernet is not available, an application can send data as a generic DIVA data packet as well. DIVA serves as a way to transport data from source to destination by using the DIVA data packet protocol.

Examples of bulk data transfer include:

Example 1: A User wants to send compressed video data from a TV to a DVR. Using the TV's ASTC or DVB-T tuner, the TV receives MPEG compressed data from an over the air broadcast. The user wants to send the compressed MPEG stream to a DIVA-compliant Digital Video Recorder (DVR) for recording and viewing later. The TV would then send the MPEG file using the data sub-channel of the hybrid channel to the DVR. The assumption here is that the DIVA complaint DVR will have the ability to receive these data packets and store them on its' hard drive.

Example 2: File copy from TV to DVD-R. A user inserts a memory card into a TV and wishes to transfer the media file (such as a JPEG image) to a DVD-R for recording to DVD-ROM. The file can be sent through DIVA's data sub-channel to the destination device. Depending on the application, the protocol for sending the data may be USB or Ethernet. If the data is transferred through USB over DIVA, then both source and destination applications will need to support USB I/O.

Bi-Directional Audio:

The DIVA protocol allows audio data to be sent bi-directionally, both from Source to Sink (forward audio) and Sink to Source (backward audio). The forward audio is the primary audio path which is in sync with the primary video path. The back audio allows a separate audio path from Sink to Source.

Examples of bi-directional audio include:

Example 1: Forward audio: A DIVA set top box sends video through the primary video channel to the TV. The audio is sent through the forward channel audio and is in sync with the video that is sent through the video channel.

Example 2: Backward audio: A user is watching an HD over the air broadcast with surround sound audio. The tuner in use is inside the TV. However, the TV is not capable of outputting surround sound audio. In order to play the sound through his or her AV receiver without adding an additional cable, the user needs a backward audio to send audio data from the TV to the AV receiver. In this case, the AV Receiver will also need to be DIVA-compliant to receive the audio data from the TV.

Foregoing described embodiments of the invention are provided as illustrations and descriptions. They are not intended to limit the invention to precise form described. In particular, it is contemplated that functional implementation of embodiments of the invention described herein may be implemented equivalently in hardware, software, firmware, and/or other available functional components or building blocks, and that networks may be wired, wireless, or a combination of wired and wireless. Other variations and embodiments are possible in light of the above teachings, and it is thus intended that the scope of invention not be limited by this Detailed Description, but by the claims following.

The invention claimed is:

1. A communication system, comprising:
a first node;
a second node;
a serial communication link between the first node and the second node, configured to transmit digital video data and an embedded clock signal from the first node to the second node over one or more video channels of the link, the embedded clock signal being embedded in the video data; and
a high-bandwidth, bi-directional hybrid link between the first node and the second node wherein the hybrid link is a non-TMDS link, the hybrid link including one or more sub-channels for transmission of data;
wherein the first node and the second node are configured to transmit at least a first stream of data to the other through a hybrid channel over the one or more sub-channels of the hybrid link; and
wherein the hybrid link is configured to deliver a reference clock for the serial communication link, the hybrid link to switch from transmission of the reference clock to transmission of data via the one or more sub-channels including transmission of the first stream of data upon detection of an initial lock of the serial communication link, wherein the initial lock of the serial communication link is aided by the reference clock delivered over the hybrid link.

2. The system of claim 1, wherein the bandwidth of the serial communication link is scaled according to a video pixel frequency.

3. The system of claim 1, wherein the one or more sub-channels of the hybrid channel includes:
an audio sub-channel for digital audio streaming;
a command sub-channel for content protection, consumer electronics control, and other control commands; and
a data sub-channel for user data transfers.

4. The system of claim 1, wherein circuitry in the hybrid channel is clocked by the reference clock when the hybrid channel is assigned to the reference clock.

5. The system of claim 1, wherein circuitry in the hybrid channel is clocked by the embedded clock recovered from the serial communication channel when the hybrid channel is assigned to other than the reference clock.

6. The system of claim 1, wherein circuitry in the hybrid channel is clocked by local oscillators when the hybrid channel is assigned to other than the reference clock.

7. The system of claim 1, further comprising a lock detection circuit on the second node and a switch that switches between the reference clock and the sub-channels.

8. The system of claim 3 further comprising a virtual switch that arbitrates between the audio sub-channel, the command sub-channel and the data sub-channel.

9. The system of claim 1, wherein the hybrid channel is a high-speed half-duplex channel made logically a full-duplex bi-directional channel by alternating direction of transmission.

10. The system of claim 1, wherein the serial communication link uses an IBM 8B10B channel coding, wherein a clock channel is embedded within a digital video data channel, and wherein the transmitter is configured to transmit the embedded clock in the embedded clock channel.

11. The system of claim 1, wherein the serial communication link uses a TMDS channel coding wherein a clock channel is embedded within a digital video data channel, and wherein the first node is configured to transmit the embedded clock in the embedded clock channel.

12. The system of claim 1 wherein, in the hybrid channel, the data is transmitted in packets of varying sizes and flow direction between the first node and the second node changes after every packet transfer.

13. A communication node configured to be coupled to a serial communication link having at least one video channel and to be coupled to a high-bandwidth bi-directional hybrid link having at least one sub-channel, the communication node comprising:
an input coupled to receive video data and an embedded clock signal or signals from a video system via the serial communication link;
a hybrid channel interface coupled to receive and transmit user and application data to and from a user and application sub-system and to receive a reference clock signal;
video outputs configured to be coupled to the serial communication link, wherein the embedded clock signal is embedded with video data in the serial communication link; and
circuitry coupled between the outputs and each said input and interface, and configured to generate video data and user and application data, wherein the video data is transmitted through the serial communication link, and the user and application data is transmitted through a general purpose data channel in the hybrid link;
wherein the communication node is configured to use the reference clock to aid in obtaining a lock on the serial communication link, and wherein, upon detecting the lock on the serial communication link, the hybrid channel interface is to switch from reception of the reference clock signal to receiving a reference clock signal to receiving and transmitting the user and application data via the hybrid link.

14. The communication node of claim 13, wherein the user and application data includes audio data, command/control data, and bulk data.

15. The communication node of claim 14, wherein the user and application data further include compressed video data.

16. A communication node configured to be coupled to a serial communication link having at least one video channel and a high-bandwidth, bi-directional hybrid channel having at least one sub-channel, the communication node comprising:
an input configured to be coupled to the serial communication link, to receive video data and an embedded clock signal or signals, the embedded clock signal or signals being embedded in the video data;
a hybrid channel interface coupled to receive and transmit user and application data to and from user and application sub-systems and to receive a reference clock signal;
a video output for asserting video data received from the serial communication link; and
circuitry, coupled between said input and each said interface and video output, and configured to recover the embedded clock from the video data,
wherein the received video data is asserted to the video output, and the user and application data is transmitted through a general purpose data channel in the hybrid link;
wherein the communication node is configured to use the reference clock to aid in obtaining a lock on the serial communication link, and wherein, upon detecting the lock on the serial communication link, the hybrid channel interface is to switch from reception of the reference clock signal to receiving and transmitting user and application data via the hybrid link.

17. The communication node of claim 16, wherein the user and application data include audio data, command/control data, and bulk data.

18. In a communication system, a method of communication comprising:
transmitting digital video data and an embedded clock signal from a first node to a second node over one or more video channels of a serial communication link, the embedded clock signal being embedded in the video data;
transmitting a reference clock for the serial communication link over a hybrid link from the first node to the second node;
detecting a lock on the serial communication link by the second node;
switching the hybrid link from the transmission of the reference clock to transmission via one or more sub-channels of a hybrid channel in response to the detecting of the lock on the serial communication link;
transmitting at least one stream of supporting data between the first node and the second node over a sub-channel of the one or more sub-channels of the hybrid channel; and
scaling the bandwidth of the serial communication link according to a video pixel frequency.

19. The method of claim 18, wherein the one or more sub-channels of the hybrid channel includes a plurality of sub-channels, and further comprising, in the hybrid link:

transmitting digital audio data over an audio sub-channel of the plurality of sub-channels for digital audio streaming;

transmitting command data over a command sub-channel of the plurality of sub-channels for content protection, consumer electronics control, and other control commands; and transmitting bulk data over a data sub-channel of the plurality of sub-channels for user data transfers.

20. The method of claim 19, further comprising arbitrating, in the hybrid channel, between the audio sub-channel, the command sub-channel and the data sub-channel based on a predefined priority of the sub-channels.

21. The method of claim 18, further comprising alternating the direction of transmission over the hybrid link such that functionality of the hybrid channel is logically that of a full-duplex bi-directional channel.

22. The method of claim 18, further comprising, in the hybrid channel, transmitting data in packets of varying sizes and changing the flow direction between the first and second node after every packet transfer.

23. In a communication system, a method for transmitting and receiving a clock signal and data packet over a high bandwidth bi-directional hybrid link between a first and second node, the method comprising:

delivering, through the hybrid link, a reference clock signal, to aid synchronization of a serial communication link between the first node and the second node, the serial communication link to transmit digital video data and an embedded clock signal from the first node to the second node;

receiving confirmation of synchronization of the serial communication link;

switching the hybrid link from the delivering of the reference clock signal to delivering of data via one or more sub-channels of the hybrid link in response to the receipt of the confirmation of synchronization; and delivering the data packet via a sub-channel of the one or more sub-channels of the hybrid link after the synchronization of the serial link is established.

24. The method of claim 23, further comprising delivering a plurality of data packets through the hybrid link.

25. The method of claim 24, wherein the plurality of data packets include audio data, command data, and user data.

26. The method of claim 23, wherein the hybrid link comprises a bi-directional channel coupled between a first transceiver in the first node and a second transceiver in the second node.

* * * * *